United States Patent
Iardella et al.

(10) Patent No.: US 8,967,666 B2
(45) Date of Patent: Mar. 3, 2015

(54) POSITIONING STRUCTURE FOR A FIREARM ON A VEHICLE

(75) Inventors: Carlo Alberto Iardella, La Spezia (IT); Paolo Arrighi, La Spezia (IT)

(73) Assignee: OTO Melara S.p.A., La Spezia (SP) (IT)

( * ) Notice: Subject to any disclaimer, the term of this patent is extended or adjusted under 35 U.S.C. 154(b) by 0 days.

(21) Appl. No.: 14/005,785

(22) PCT Filed: Mar. 13, 2012

(86) PCT No.: PCT/IB2012/000477
§ 371 (c)(1), (2), (4) Date: Nov. 25, 2013

(87) PCT Pub. No.: WO2013/050814
PCT Pub. Date: Apr. 11, 2013

(65) Prior Publication Data
US 2014/0084573 A1   Mar. 27, 2014

(30) Foreign Application Priority Data
Mar. 18, 2011 (IT) .............................. TO2011A0239

(51) Int. Cl.
| F41A 23/34 | (2006.01) |
| F41A 23/52 | (2006.01) |
| F41A 27/18 | (2006.01) |
| F41A 27/14 | (2006.01) |
| B60R 21/13 | (2006.01) |

(52) U.S. Cl.
CPC ................ *F41A 23/34* (2013.01); *F41A 23/52* (2013.01); *F41A 27/18* (2013.01); *B60R 21/13* (2013.01); *F41A 27/14* (2013.01)
USPC ......................................... 280/756; 89/40.03

(58) Field of Classification Search
CPC ......... F41A 23/34; F41A 23/52; F41A 23/00; F41A 27/18
USPC .................... 280/756; 89/40.03, 37.01, 37.13
See application file for complete search history.

(56) References Cited

U.S. PATENT DOCUMENTS

| 1,273,178 | A | * | 7/1918 | Perry et al. .................... 89/40.04 |
| 1,273,179 | A | * | 7/1918 | Perry et al. .................... 89/40.04 |
| 4,417,499 | A | * | 11/1983 | Grosser et al. ............... 89/36.13 |
| 4,574,685 | A | * | 3/1986 | Sanborn et al. .............. 89/37.14 |
| 4,686,888 | A | * | 8/1987 | Sanborn et al. .............. 89/37.13 |
| 5,056,409 | A | * | 10/1991 | Allais et al. .................. 89/37.01 |
| 5,212,655 | A | * | 5/1993 | Boehle .......................... 702/155 |
| 6,189,962 | B1 | * | 2/2001 | Henderson .................... 296/218 |

(Continued)

FOREIGN PATENT DOCUMENTS

DE   10 2006 017038   10/2007

OTHER PUBLICATIONS

International Search Report for International Application No. PCT/IB2012/000477 mailed Jul. 10, 2012.

(Continued)

*Primary Examiner* — Nicole Verley
(74) *Attorney, Agent, or Firm* — Merchant & Gould P.C.

(57) ABSTRACT

Positioning structure for an armament on a vehicle equipped with an armored cockpit (A) and wherein the armament is constrained to the top of the vehicle. The positioning structure engages directly to the frame of the vehicle and in particular to the reinforcement bars (B) typically called roll-bars, which delimit the armored cockpit.

7 Claims, 3 Drawing Sheets

(56) References Cited

U.S. PATENT DOCUMENTS

| | | | |
|---|---|---|---|
| 7,086,192 B2* | 8/2006 | Deros | 42/94 |
| 7,565,941 B2* | 7/2009 | Cunningham | 180/167 |
| 8,347,776 B2* | 1/2013 | Frey et al. | 89/37.13 |
| 8,408,347 B2* | 4/2013 | Chapman | 180/89.1 |
| 8,443,710 B2* | 5/2013 | Domholt et al. | 89/41.02 |
| 8,584,573 B2* | 11/2013 | Prado et al. | 89/38 |
| 8,612,099 B2* | 12/2013 | Kranz et al. | 701/45 |
| 8,622,457 B1* | 1/2014 | McIntire | 296/102 |
| 2005/0230163 A1 | 10/2005 | Cunningham | |
| 2005/0257680 A1 | 11/2005 | Russell | |
| 2007/0051235 A1* | 3/2007 | Hawkes et al. | 89/37.04 |
| 2007/0251375 A1* | 11/2007 | Colburn et al. | 89/37.01 |
| 2008/0308334 A1 | 12/2008 | Leonard | |
| 2009/0314883 A1* | 12/2009 | Arlton et al. | 244/63 |
| 2012/0056411 A1* | 3/2012 | Nakamura et al. | 280/756 |
| 2012/0312607 A1* | 12/2012 | Joynt et al. | 180/54.1 |

OTHER PUBLICATIONS

Hammick et al. "Light Strike Vehicles Long-Range Solution to a Long-Term Problem." *International Defense Review, Jane's Information Group.* (1991) 24(3):225-227.

* cited by examiner

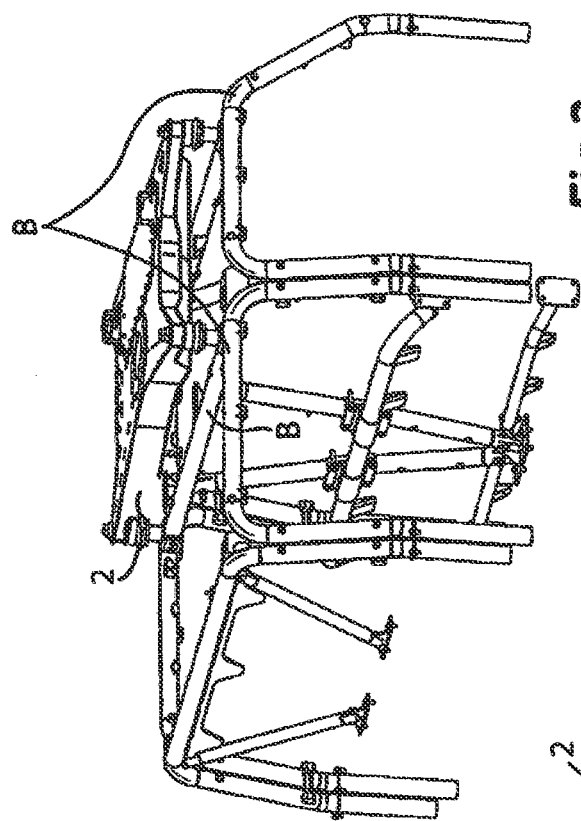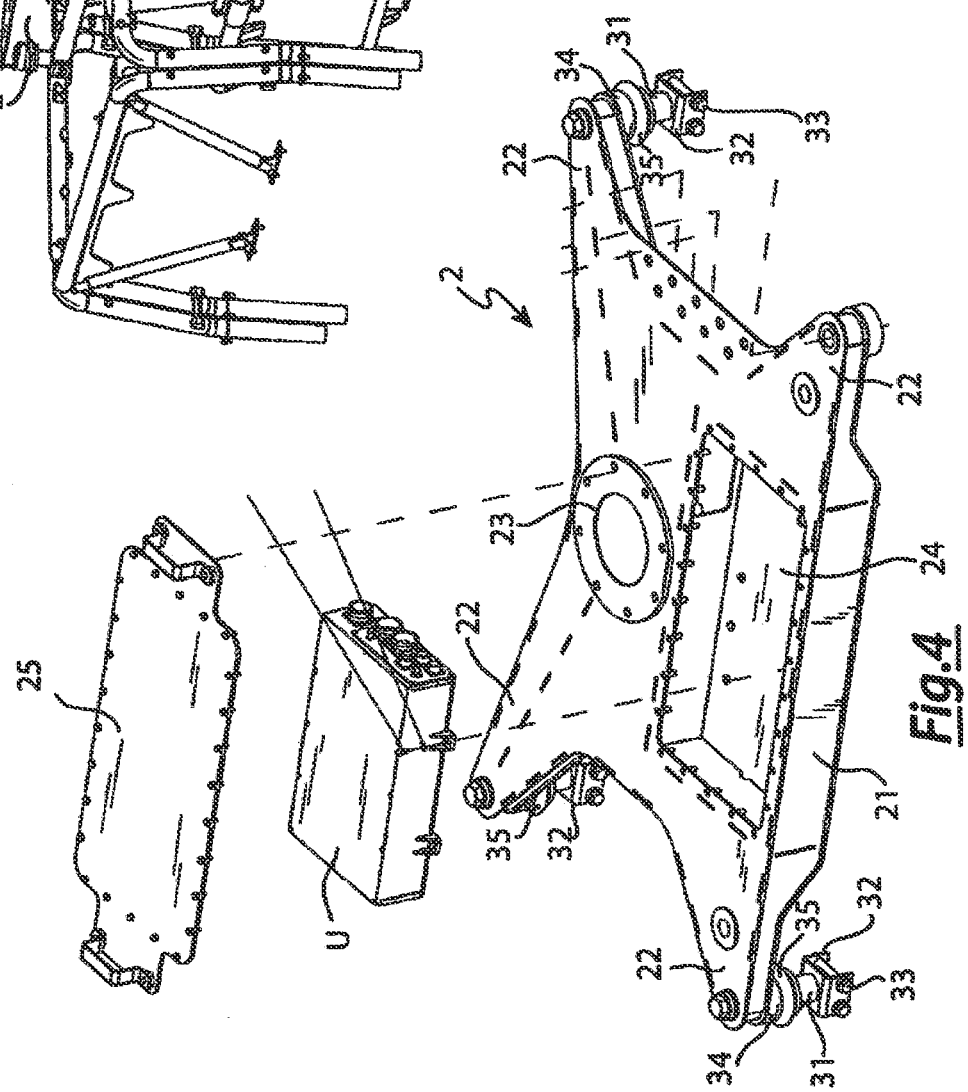

POSITIONING STRUCTURE FOR A FIREARM ON A VEHICLE

This application is a National Stage Application of PCT/IB2012/000477, filed 13 Mar. 2012, which claims benefit of Serial No. TO2011A000239, filed 18 Mar. 2011 in Italy and which applications are incorporated herein by reference. To the extent appropriate, a claim of priority is made to each of the above disclosed applications.

BACKGROUND

The present invention concerns a vehicle, for example a tracked or wheeled vehicle of the military type, provided with artillery means on its top or roof.

In the state of the art there are known armoured vehicles provided with a central turret, possibly rotatable, on which the main armament of the vehicle is mounted, which usually consists of a machinegun. Such a machinegun is equipped with an electronic control unit connected to it that controls the positioning of the firearm and commands the firing mechanism of the firearm itself.

The user in charge of actuating the firearm is located inside the vehicle and uses a control interface, suitably connected to the electronic unit, for example via cable, to control the firing and the positioning of the barrel and in general all of the functions permitted by the electronic unit.

Clearly, the stable positioning of the firearm and of its electronic unit are equally essential for the correct operation of the firearm itself and of the vehicle in general. In particular, if the vehicle does not have positioning means for the firearm integrated with the vehicle itself right from its manufacture, both the positioning and the control of the firearm can be difficult.

SUMMARY

The present invention proposes to avoid the aforementioned drawbacks by proposing a positioning structure for a firearm on a vehicle, for example wheeled or tracked, that fixedly connects directly to the frame of the vehicle itself on its top, without the roof or other parts of the vehicle being substantially altered in the physiognomy and in their mechanical characteristics.

BRIEF DESCRIPTION OF THE DRAWINGS

The characteristics and advantages of the vehicle according to the present invention will become clearer from the following description, given as an example and not for limiting purposes, of an embodiment of the invention with reference to the attached figures, in which:

FIG. 2 represents the positioning structure according to the present invention fixedly connected to the vehicle's roll-bar;

FIG. 4 represents an exploded view of the positioning structure according to the present invention.

DETAILED DESCRIPTION

Figure 1B:
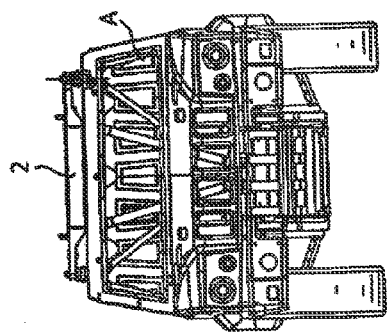
FIGS. 1a-1d respectively represent side, front, top and perspective views of a vehicle provided with the positioning structure for a firearm on its top according to the present invention.
Figure 1D:
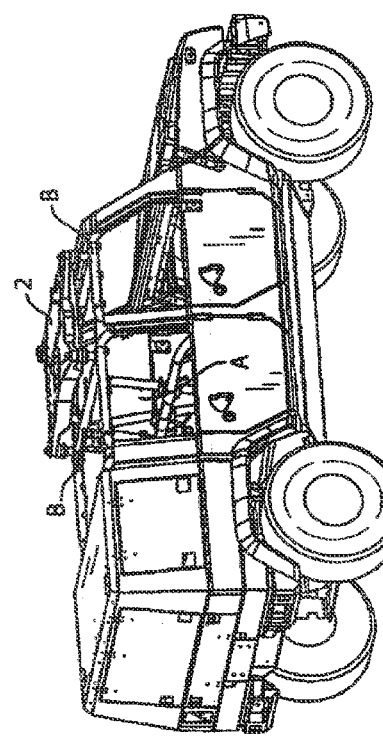
Figure 1A:
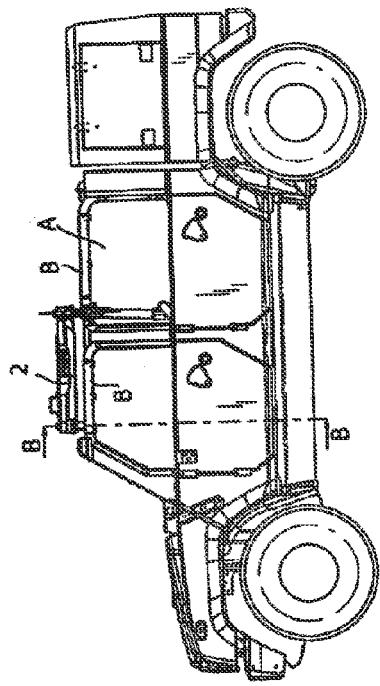
Figure 1C:
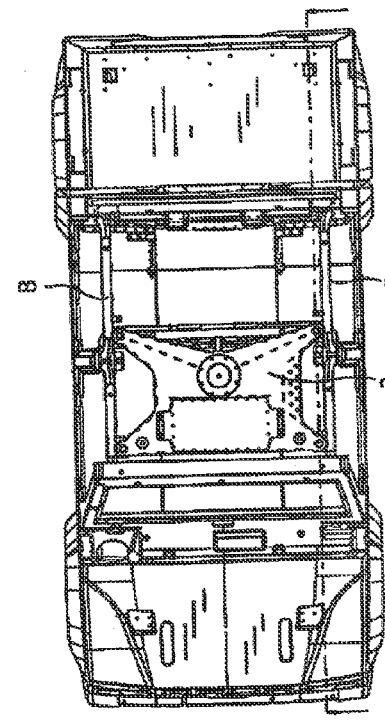
Figure 3:
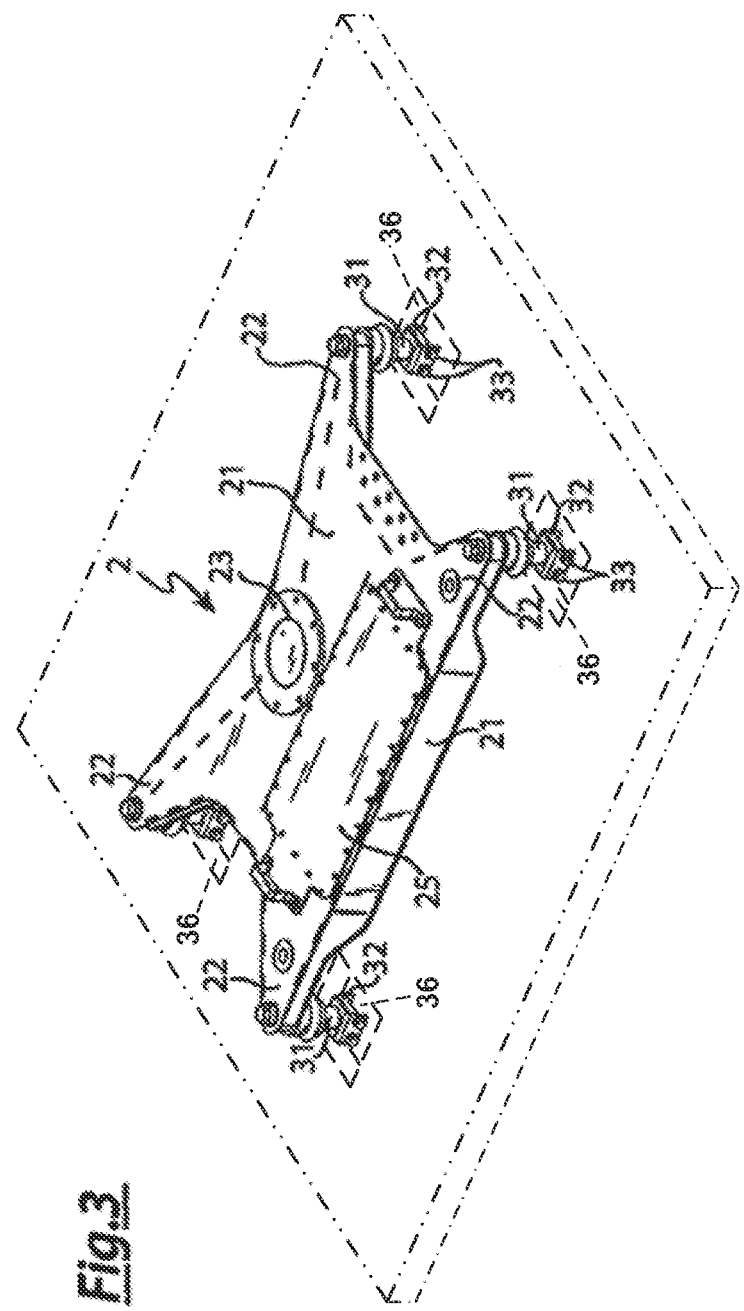
FIG. 3 illustrates a perspective view of the positioning structure according to the present invention.

With reference to the listed figures, the vehicle illustrated according to the present invention comprises an armoured cockpit A and preferably a rotary movement system and it is provided with a main armament that usually consists of a machinegun (for example having calibres 5.56 mm, 7.62 mm, 12.7 mm, 14.5 mm, 25 mm, 30 mm).

Said a main armament according to the present invention is fixedly connected on the top of the vehicle through a positioning structure 2 that advantageously fixedly connects directly to the frame of the vehicle and in particular to reinforcement bars B (typically called roll-bars) that define the cockpit.

By "roll-bar" we mean the protective structure provided to protect the occupants of a vehicle when it rolls over or is involved in an accident of whatever kind or seriousness. It is generally built using high-strength steel, since it must be able to withstand the weight of the vehicle without breaking. It is an extremely useful safety device and therefore it is normally used in military vehicles.

The present invention exploits the presence of such a roll-bar to stably constrain the main armament to the vehicle through such a positioning structure that essentially comprises a box-shaped plate 21 provided, on its periphery, with a plurality of portions of constraint 22 to bars of such a roll-bar and to a fastening portion for such a main armament, preferably formed in the central zone of the plate for reasons of balance of the structure. The plate is made of dimensions such as to be adapted onto the roof of a specific vehicle and of dimensions, rigidity and strength such as to house a specific armament.

The plate generally has a quadrangular shape and the portions of constraint to the bars are usually arranged at the corners of such a quadrangular shape and are configured like triangular appendices. At such portions of constraint, means for constraining the plate to the quoted bars are provided, for example made for each portion from a sleeve 31, preferably cylindrical, fixed at one end to the portion of constraint 22 and at the opposite end having a bracket 32, which crimps to the aforementioned bars.

In this way, in order to constrain the positioning structure of the firearm to the roof or to the top of the vehicle it is sufficient to form holes 36 on the roof of the vehicle for the sleeves to pass through inside the cockpit, in the zone that has the horizontal bars of the roll-bar. The brackets take care of fastening the sleeves to the bars, for example through bolts 33. Around the sleeve there are advantageously collars 34, provided with gaskets 35 that are positioned on the hole 36 of the roof so as to avoid the passage of humidity and other agents through the hole 36 itself. Fastening portion 23 for such a main armament substantially comprises a circumferential fifth wheel bored in its centre, which allows the armament to be slotted from above into the hole and constrained on the circumference.

The plate also comprises a housing 24 for an electronic control unit for the armament, preferably formed inside the box-shaped space in the central area of the plate itself.

Such a housing advantageously has a cover 25 adapted for closing and protecting electronic unit U when it is positioned inside the housing itself and for stiffening the plate.

The plate is preferably made from a light alloy, composite materials (glass fibre, carbon fibre). When the weight is not a limiting aspect, it can also be made from steel and/or stainless steel.

The invention claimed is:

1. A structure configured for positioning and constraining an armament on a top of a vehicle equipped with an armored cockpit; said positioning structure engages directly to the frame of the vehicle and to roll-bars, which delimit the armored cockpit; the structure comprising:

a plate provided, at a periphery, with a plurality of portions of constraint to bars of said roll-bars and to an armament fastening portion;

means for constraining the plate to said bars corresponding to said portions of constraint, obtained for each portion by a sleeve, fastened at an end to the portion of constraint and which at an opposed end has a bracket which crimps to said bars;

the structure around the sleeve is provided with collars, provided with gaskets which locate on a hole of the top of the vehicle.

2. The structure according to claim 1, wherein the fastening portion is in a central zone of the plate.

3. The structure according to claim 1, wherein the plate has a square shape and the portions of constraint to the bars are generally arranged to the angles of said square shape and are shaped as triangular appendices.

4. The structure according to claim 1, wherein the fastening portion, comprises substantially a circumferential fifth wheel bored in a center.

5. The structure according to claim 1, wherein the plate comprises a housing for an electronic control unit, obtained through a room in a central zone of the plate.

6. The structure according to claim 5, wherein said housing has a cover for closing and protecting the electronic unit when the electronic unit is positioned inside the housing and for stiffening the structure.

7. The structure according to claim 1, wherein said plate is a box structure.

* * * * *